(12) United States Patent
De Oliveira et al.

(10) Patent No.: US 12,020,319 B2
(45) Date of Patent: Jun. 25, 2024

(54) AUTOMATED RISK PRIORITIZATION AND DEFAULT DETECTION

(71) Applicant: Capital One Services, LLC, McLean, VA (US)

(72) Inventors: Pedro Partiti De Oliveira, Dallas, TX (US); Marrian Kitchens, Leonard, TX (US); Papa D. Ndiaye, Kenner, LA (US); Joseph T. Allison, Prosper, TX (US); Collin Longmire, McKinney, TX (US); John Runge, Plano, TX (US); Dong Ji, Plano, TX (US); Abhishek Tewari, Allahabad (IN); Bing Liu, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/809,168

(22) Filed: Jun. 27, 2022

(65) Prior Publication Data

US 2023/0260018 A1    Aug. 17, 2023

(30) Foreign Application Priority Data

Feb. 15, 2022  (IN) .............................. 202211008047

(51) Int. Cl.
*G06Q 40/00* (2023.01)
*G06Q 40/03* (2023.01)

(52) U.S. Cl.
CPC .................... *G06Q 40/03* (2023.01)

(58) Field of Classification Search
CPC .............. G06Q 40/00; G06Q 40/03

USPC .................................................. 705/4, 35–45
See application file for complete search history.

(56) References Cited

U.S. PATENT DOCUMENTS

| | | | |
|---|---|---|---|
| 7,873,570 B2 | 1/2011 | Cagan et al. | |
| 8,458,082 B2 | 6/2013 | Halper et al. | |
| 9,147,217 B1 | 9/2015 | Zabritski et al. | |
| 2005/0137904 A1 | 6/2005 | Lane et al. | |
| 2007/0033126 A1 | 2/2007 | Cagan et al. | |
| 2007/0226131 A1 | 9/2007 | Decker et al. | |
| 2011/0022541 A1 | 1/2011 | Miles et al. | |
| 2018/0078843 A1 | 3/2018 | Tran et al. | |
| 2020/0023846 A1* | 1/2020 | Husain | H04W 4/44 |
| 2020/0294135 A1 | 9/2020 | Cella | |
| 2020/0311816 A1 | 10/2020 | Calvin | |
| 2021/0056569 A1* | 2/2021 | Silberman | G06N 20/00 |
| 2021/0142401 A1 | 5/2021 | Flowers et al. | |
| 2021/0158085 A1* | 5/2021 | Budzik | G06Q 40/03 |

(Continued)

FOREIGN PATENT DOCUMENTS

WO    2022133210 A2    6/2022

*Primary Examiner* — Eric T Wong
*Assistant Examiner* — Mohammed H Mustafa
(74) *Attorney, Agent, or Firm* — Banner & Witcoff, Ltd.

(57) ABSTRACT

Systems, methods, and apparatuses for automatically detecting the risk of dealer default are described. A machine learning model may be trained using a gradient boosting technique on a dataset that includes historical lien information, historical dealer information, and historical vehicle default information. Lien information and financing information for vehicles may be received and correlated. Furthermore, a machine learning model may generate aggregate risk scores for dealers. Furthermore, determination of an aggregate risk score that exceeds a threshold risk score may cause the generation of a notification.

20 Claims, 6 Drawing Sheets

(56) References Cited

U.S. PATENT DOCUMENTS

| | | |
|---|---|---|
| 2022/0040557 A1 | 2/2022 | Tran |
| 2022/0122171 A1* | 4/2022 | Hubard .................. G06Q 40/03 |
| 2022/0198562 A1 | 6/2022 | Cella et al. |
| 2022/0207541 A1* | 6/2022 | Raman ............... G06Q 30/0201 |
| 2022/0237668 A1* | 7/2022 | Stutsman ........... G06Q 30/0278 |
| 2022/0366494 A1 | 11/2022 | Cella et al. |
| 2023/0135192 A1 | 5/2023 | Wellmann et al. |
| 2023/0260018 A1 | 8/2023 | De Oliveira et al. |

* cited by examiner

AUTOMATED RISK PRIORITIZATION AND DEFAULT DETECTION

CROSS-REFERENCE TO RELATED APPLICATION

This application claims priority to Indian Patent Application No. 202211008047, titled "AUTOMATED RISK PRIORITIZATION AND DEFAULT DETECTION" filed Feb. 15, 2022, which is hereby incorporated by reference in its entirety.

FIELD OF USE

Aspects of the disclosure relate generally to an automated method of prioritizing liens and detecting the risk of default by parties associated with the liens. More specifically, aspects of the disclosure provide for the automatic intake of information in order to prioritize liens and process information using machine learning systems that are trained to detect a risk of vehicle dealer default and generate output that is used to generate notifications associated with the risk of dealer default.

BACKGROUND

The process of listing a creditor as the primary lienholder of an asset may involve multiple parties and be time consuming or convoluted. As a result, there may be a significant delay in the time it takes for a creditor to be listed as the primary lienholder of an asset. For example, perfection of a lien for a vehicle purchased on credit at a vehicle dealership may be subject to undue delay while being processed by an administrative body (e.g., a state department of motor vehicles for the state in which the vehicle was purchased). Though some delay may be expected, an assessment of which liens are excessively delayed and a determination of which dealers are associated with those unperfected liens may enable proactive measures to be taken to ensure that the liens are perfected in a timelier manner. As such, there exists a need for better tracking of unperfected liens and correlation of those unperfected liens with dealers so that action may be taken to perfect the lien or determine why the lien has not yet been perfected.

Additionally, an unperfected lien for which a creditor has been not listed as the primary lienholder presents a risk to the creditor and the creditor's customers. In particular, creditors and their customers are exposed to the financial risk of dealer default (e.g., the dealer going out of business) before the lien has been perfected. The dealer defaulting when a lien is unperfected may mean that the creditor does not have a security interest in, for example, a vehicle that was purchased from the dealer. This may make it difficult for a creditor to seize the asset if the need arises (e.g., nonpayment of the loan on the vehicle). These risks might be mitigated if there were a way to predict which dealers are at greater risk of defaulting, thereby allowing corrective actions to be performed before a dealer default occurs. Accordingly, there is a need for a more effective way to detect or predict dealers that present a greater risk of default.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address these and other problems, and generally improve the effectiveness with which the risk of dealer default (e.g., the risk of a dealer ceasing operations) is detected by offering an automatic risk detection method to identify dealers that have an elevated risk of default.

Aspects described herein may allow for automatic methods, systems, and apparatuses to detect the risk of dealer default. This may have the effect of detecting dealers that cease operations before title to property (e.g., title to a vehicle) has been perfected such that the appropriate creditor is listed as the primary lienholder. In this way, the financial risk for creditors and customers may be reduced since proactive measures may be taken to perfect title to property before the at-risk dealers have defaulted. According to some aspects, these and other benefits may be achieved by using a machine learning model that is trained to detect the risk of dealer default, thereby allowing for the generation of a notification (e.g., a notification that a particular dealer is at risk of default) when the dealer's risk score exceeds a threshold risk score. In implementation, this may be effectuated by using large datasets to train the machine learning model to detect the risk of dealer default. These datasets may include historical lien information, historical dealer information, and/or historical vehicle default information, that may be obtained from sources including dealership records, credit agencies, and various departments of motor vehicles. Furthermore, the machine learning models may be periodically trained using updated datasets, thereby allowing for improved accuracy of risk detection that is based on more recent information.

More particularly, some aspects described herein may provide a computer-implemented method for determining a risk of dealer default. The method may comprise training, using a dataset comprising historical lien information, historical dealer information, and historical vehicle default information, a machine learning model to detect a risk of dealer default. The training may comprise: generating, based in part on performing gradient boosting on a first subset of the dataset, a first decision tree of the machine learning model; and generating, based in part on performing gradient boosting on a second subset of the dataset, a second decision tree of the machine learning model. The method may further comprise receiving, by a computing device, lien information corresponding to one or more vehicles, the lien information comprising title perfection information; receiving, by the computing device, financing information corresponding to the one or more vehicles; correlating (e.g., by the computing device) the lien information with the financing information; generating (e.g., by the computing device and may be based on the lien information correlated with the financing information, the first decision tree, the second decision tree, and the machine learning model) aggregate risk scores for respective dealers, the aggregate risk scores comprising a first aggregate risk score for a first dealer; determining (e.g., by the computing device and may be based on comparing the first aggregate risk score with other risk scores of the aggregate risk scores) that the first aggregate risk score exceeds a threshold risk score, the threshold risk score being determined based on the aggregate risk scores; and generating, by the computing device, a notification that the first aggregate risk score exceeds the threshold risk score.

Further, the method may comprise determining the threshold risk score by determining a deviation of the first aggregate risk score based on a distribution of the aggregate risk scores. Still, further, the method may comprise determining the threshold risk score based on inputting the aggregate risk scores and historical default information into the machine learning model. Further, the method may comprise determining, based on comparing the first aggregate risk score with other risk scores of the aggregate risk scores, that the first aggregate risk score is between a first threshold risk score and a second threshold risk score. The threshold risk score may be determined based on the aggregate risk scores. Determining the first threshold risk score and the second threshold risk score may include determining a deviation range of the first aggregate risk score based on a distribution of the aggregate risk scores.

According to aspects described herein, historical lien information may comprise lien perfection information corresponding to the one or more vehicles. Historical dealer information may comprise historical inventory information corresponding to the respective dealers. Historical vehicle default information may comprise information indicating a rate of default corresponding to historical vehicles and one or more demographics. Lien information may comprise title perfection information recorded by a department of motor vehicles.

More particularly, some aspects described herein may provide an apparatus comprising: one or more processors; and memory storing instructions that, when executed by the one or more processors, cause the apparatus to: train, using a dataset comprising historical lien information, historical dealer information, and historical vehicle default information, a machine learning model to detect a risk of dealer default, wherein the training comprises: generating, based in part on performing gradient boosting on a first subset of the dataset, a first decision tree of the machine learning model; and generating, based in part on performing gradient boosting on a second subset of the dataset, a second decision tree of the machine learning model; receive lien information corresponding to one or more vehicles associated with one or more dealerships, wherein the lien information comprises title perfection information; receive financing information corresponding to the one or more vehicles; correlate the lien information with the financing information; generate, based on the lien information correlated with the financing information, based on the first decision tree, based on the second decision tree, and based on using the machine learning model, aggregate risk scores for respective dealers, wherein the aggregate risk scores comprise a first aggregate risk score for a first dealer; determine, based on comparing the first aggregate risk score with other risk scores of the aggregate risk scores, that the first aggregate risk score is between a first threshold risk score and a second threshold risk score, wherein the threshold risk score is determined based on the aggregate risk scores; and generate a notification that the first aggregate risk score is between the first threshold risk score and the second threshold risk score.

More particularly, some aspects described herein may provide a system comprising: a first computing device comprising: one or more first processors; and first memory storing first instructions that, when executed by the one or more first processors, cause the first computing device to: train, using historical lien information, historical dealer information, and historical vehicle default information, a machine learning model to detect a risk of dealer default, wherein the machine learning model is trained using gradient boosting; and a second computing device comprising: one or more second processors; and second memory storing second instructions that, when executed by the one or more second processors, cause the second computing device to: receive lien information corresponding to one or more vehicles, wherein the lien information comprises title perfection information; receive financing information corresponding to the one or more vehicles associated with one or more dealerships; correlate, the lien information with the financing information; determine, based on the lien information correlated with the financing information, and using the machine learning model, aggregate risk scores for respective dealers, wherein the aggregate risk scores comprise a first aggregate risk score for a first dealer; determining, based on inputting the aggregate risk scores and historical default information into the machine learning model, a threshold risk score; determine, based on comparing the first aggregate risk score with other risk scores of the aggregate risk scores; that the first aggregate risk score exceeds the threshold risk score; and generate a notification that the first aggregate risk score exceeds the threshold risk score.

Corresponding apparatuses, devices, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
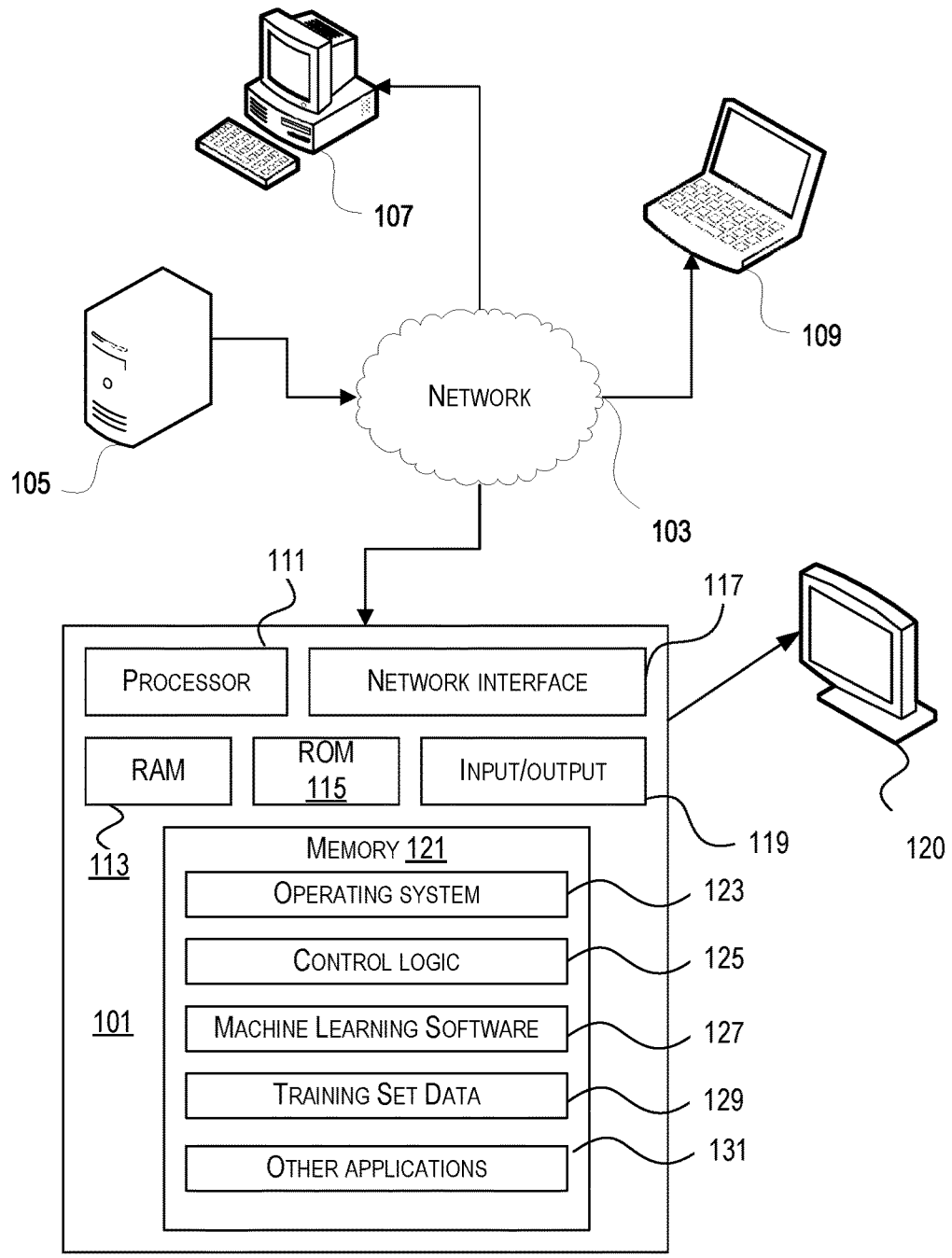
FIG. 1 illustrates an example of a computing system that may be used to implement one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As used herein, the term "dealer" may mean any entity (e.g., a natural person and/or an organization) that buys, sells, and/or trades goods and/or services. For example, the dealer may include a company (e.g., a vehicle dealer) that buys, sells, and/or trades motor vehicles and may arrange and/or manage loans for customers (e.g., natural persons and/or organizations) that purchase vehicles from the dealer. Further, the term dealer may be associated with a dealership which may refer to a business established to operate under the authority of the dealer and/or a location (e.g., a physical location and/or an electronic location which may include an Internet website) at which the dealer operates.

The process of purchasing a vehicle may involve a payor (e.g., the vehicle buyer) obtaining a loan from a creditor (e.g., a bank or other financial institution), with a dealer (e.g., a vehicle dealer) acting as an intermediary between the payor and the creditor. The payor may then pay for the vehicle in installments over some period of time. To establish the creditor's security interest over the vehicle, the payor (e.g., the hence) will grant a lien to the creditor (e.g., the lienor or lien holder). The lien establishes the creditor's right to seize the vehicle if the payor defaults on their payments to the creditor. However, the creditor does not have a security interest over the vehicle until the lien has been perfected. Because lien perfection is not automatic the creditor is exposed to increased risk until the process of lien perfection has been completed at which time there is a perfected lien which gives the creditor the benefit of the lien.

The process of lien perfection may include the use of information from a payor/lienee (e.g., the vehicle buyer), an indirect lender (e.g., the dealer from which the vehicle is purchased), an administrative body (e.g., a department of motor vehicles), and/or a creditor/lienor that provides credit to the payor via the indirect lender. Furthermore, the process of perfecting the lien on the vehicle may require some action on the part of a dealer (e.g., a dealer filing a financing statement with the administrative body) before the lien is perfected. As a result, if the dealer does not perform some required part of the perfection process the lien may not be perfected. For example, if a dealer becomes insolvent and goes out of business, the lien may not be perfected, which presents an issue to the creditor since a security interest over the vehicle has not been established.

To reduce the creditor's risk, the aspects discussed herein may, for example, prioritizing liens that are being processed by the administrative body based on the risks of dealer default associated with the liens. Prioritizing the liens may include filtering the liens by accessing lien information from the administrative body and determining the liens that have been unperfected for relatively longer durations. Filtering liens based on some criteria (e.g., the duration the liens have been unperfected) may reduce the search space and allow for more targeted detection of liens that are associated with higher risk dealers. Further, the aspects discussed herein may use machine learning models to determine risk scores (e.g., risk scores related to a dealer's risk of default) for the dealers associated with the filtered liens. The machine learning models may be configured and/or trained to more accurately detect higher risk dealers which may result in a reduction in the false positive identification of dealers that are not actually high risk. Based on output from the machine learning model, notifications associated with higher risk dealers may be generated and used to enable the performance of proactive action to perfect the liens associated with those higher risk dealers.

By way of introduction, aspects discussed herein may relate to systems, methods, and techniques for prioritizing liens (e.g., unperfected liens). Further, the system may configure and/or train a machine learning model using historical lien information that may correspond to historical liens and information associated with perfection of those liens including the dealers associated with the liens, the amount of time the before the liens were perfected, and the liens that were not perfected. In particular, the machine learning model may be configured and/or trained to determine the circumstances (e.g., the dealers associated with certain liens) that may result in a dealer defaulting before the lien is perfected. The system may then prioritize the liens based on criteria such as the time the liens have remained unperfected (e.g., the liens that have been unperfected for the longest amount of time may have the highest priority) and correlate the prioritized lien information (e.g., current lien information) with financing information (e.g., information from lenders/creditors). The prioritized lien information may then be provided to the machine learning model which may generate output including aggregate risk scores for the dealers that are associated with the unperfected liens. The aggregate risk scores may then be used to prioritize the liens so that actions to perfect the liens associated with higher risk dealers may be taken. As discussed further herein, this combination of features may allow for increased effectiveness in prioritizing liens that are unperfected.

Furthermore, aspects discussed herein may relate to systems, methods, and techniques for detecting the risk of dealer default. Further, the system may train a machine learning model by generating a first decision tree and a second decision tree using different subsets of a dataset corresponding to historical lien information, historical dealer information, and/or historical vehicle default information. The system may also correlate lien information for vehicles with financing information and perform a gradient boosting technique using the machine learning model to generate aggregate risk scores for respective dealers. The aggregate risk scores may be used to generate a threshold risk score. The system may then determine whether a dealer's risk score exceeds the threshold risk score. If a dealer's risk score exceeds the threshold risk score, the system may generate a notification. The notification may indicate that the dealer is at risk of default, which may in turn lead to actions that mitigate the risk. As discussed further herein, this combination of features may allow for increased efficiency and accuracy in detecting the dealer's risk of default.

Before discussing these concepts in greater detail, however, several examples of a computing device that may be used in implementing and/or otherwise providing various aspects of the disclosure will first be discussed with respect to FIG. 1.

FIG. 1 illustrates an example of a computing system 100 that may be used to implement one or more illustrative aspects discussed herein. For example, computing system 100 may, in some embodiments, implement one or more aspects of the disclosure by reading and/or executing instructions and performing one or more actions based on the instructions. In some embodiments, computing system 100 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing system 100 may, in some embodiments, operate in a standalone environment. In others, computing system 100 may operate in a networked environment. As shown in FIG. 1, various computing devices including computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Computing devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, stylus, touch screen, camera, microphone, display device, audio output device including a loudspeaker, printer, etc.), and memory 121. Processor 111 may include one or more computer processing units (CPUs), graphical processing units (GPUs), and/or other processing units such as a processor adapted to perform computations associated with machine learning. Input/output interfaces 119 may include a variety of interface units and drives for reading, writing, displaying, and/or printing data or files. Input/output interfaces 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Computing devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, the computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to systems, apparatuses, and methods for prioritizing liens and detecting risks of dealer default.

Figure 2:
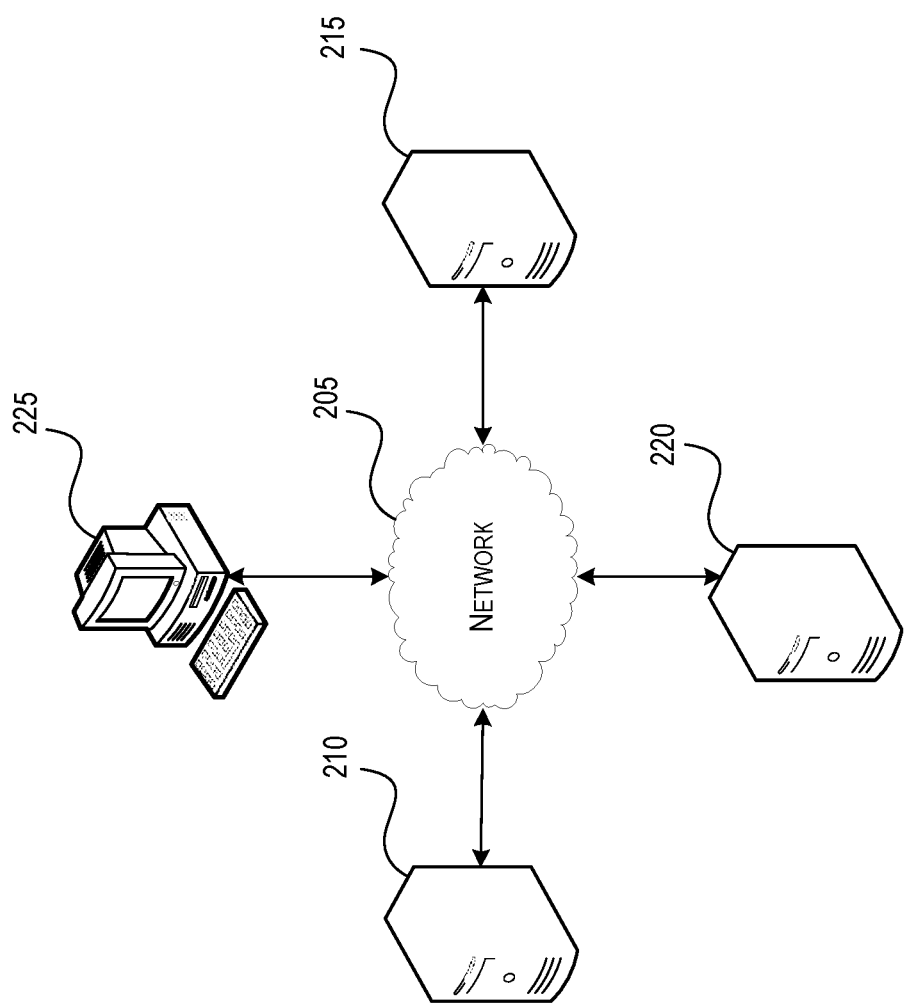
FIG. 2 illustrates an example of a computing environment according to one or more aspects of the disclosure.

FIG. 2 illustrates one example of a computing system 200 that may be used to implement one or more illustrative aspects discussed herein. For example, computing system 200 may, in some embodiments, implement one or more aspects of the disclosure by reading and/or executing instructions and performing one or more actions based on the instructions. In some embodiments, computing system 200 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing system 200 may, in some embodiments, operate in a standalone environment. In others, computing system 200 may operate in a networked environment. As shown in FIG. 2, computing devices 210, 215, 220, and/or 225 may be interconnected via a network 205 which may comprise any of the features and/or capabilities of the network 103 and may be configured to perform any of the actions and/or operations performed by the network 103. The computing devices 210, 215, 220, and/or 225 may comprise any of the features and/or capabilities of the computing devices 101, 105, 107, and/or 109 and may be configured to perform any of the actions and/or operations performed by the computing devices 101, 105, 107, and/or 109 that are described herein.

Figure 4:
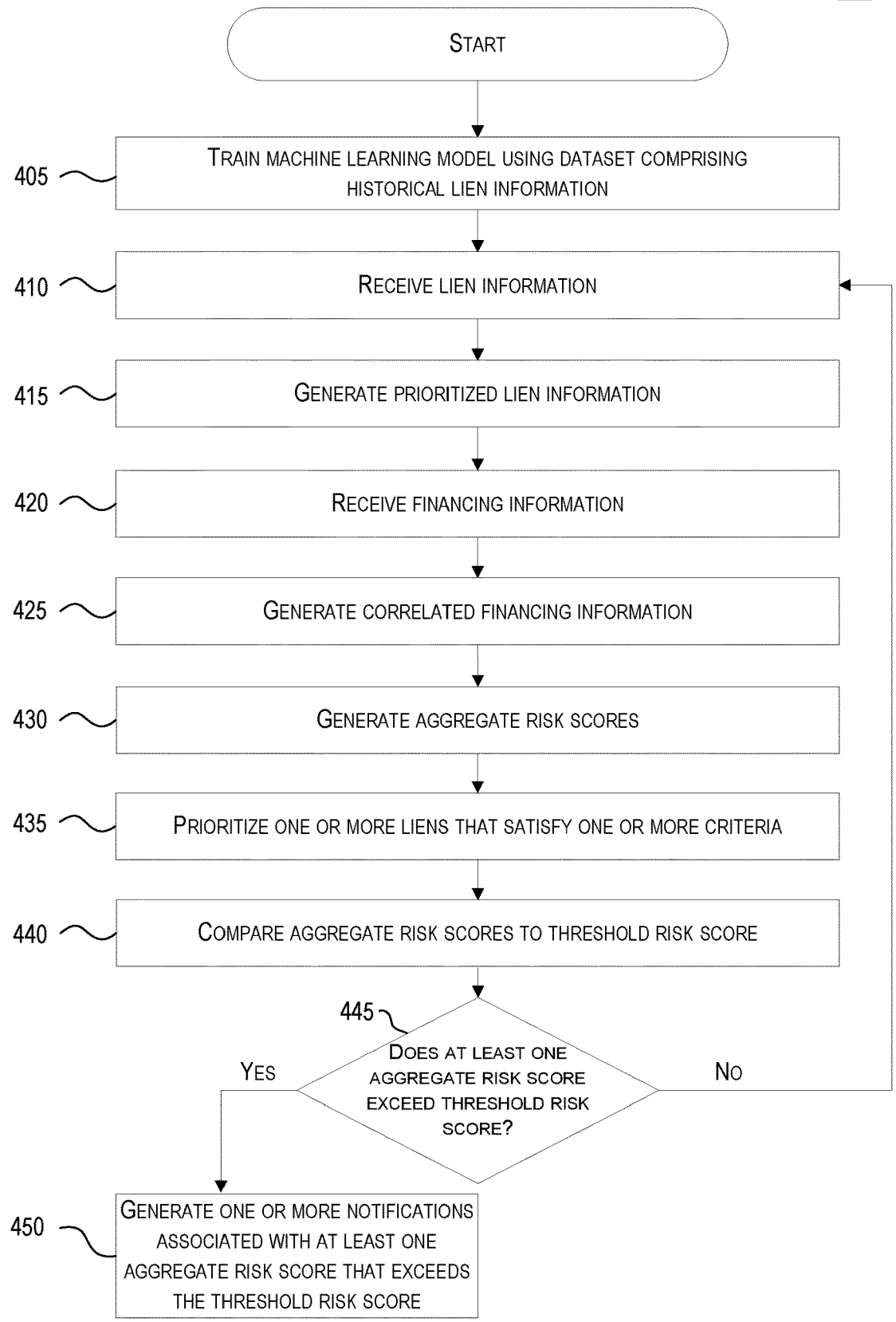
FIG. 4 illustrates an example flow chart for a method of prioritizing unperfected liens according to one or more aspects of the disclosure.
Figure 5:
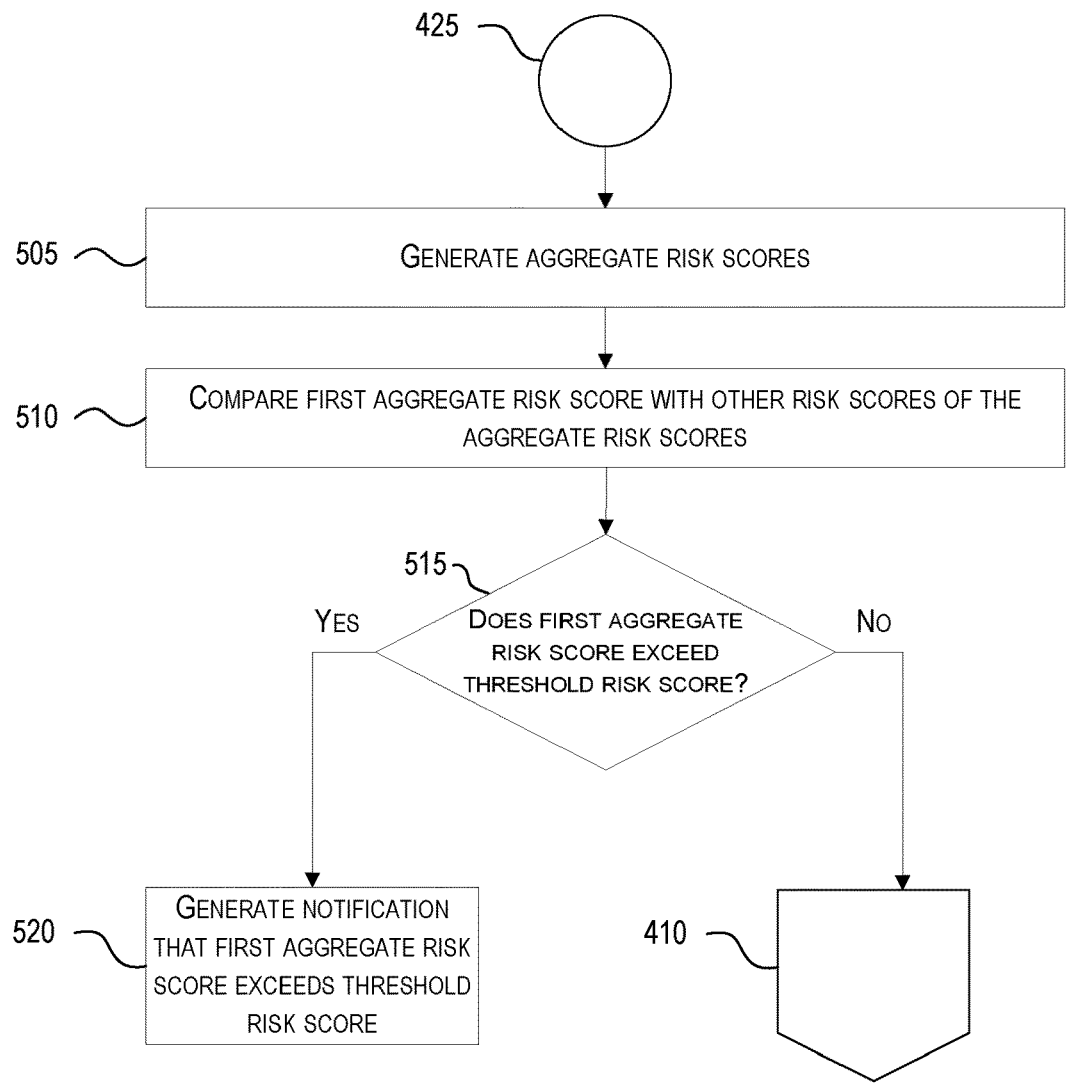
FIG. 5 illustrates an example flow chart for a method of detecting a risk of dealer default according to one or more aspects of the disclosure.

In this example, the computing device 210 may be associated with a dealer or dealership and may be configured to perform operations associated with one or more vehicles. The computing device 210 may be configured to send information and/or data to the computing device 215, 220, and/or 225 via the network 205. For example, the computing device 210 may send lien information (e.g., the lien information that is described herein, including the lien information described in the method 400 that is illustrated in FIG. 4 and the lien information that is described in the method 500 that is illustrated in FIG. 5) to the computing device 220, which may be associated with an administrative body (e.g., a department of motor vehicles). The lien information may comprise information corresponding to and/or associated with vehicles of the dealer (e.g., vehicle make, model, and/or price) and/or the names of the payors/lienees (e.g., vehicle buyers) associated with the vehicles.

The computing device 215 may be associated with a lender/creditor (e.g., a lender that provides loans to payors that purchase vehicles from dealers associated with the computing device 210) and/or a credit reporting agency that obtains information including information from one or more lenders/creditors, one or more payors, and/or one or more dealers. The computing device 215 may be configured to perform operations associated with receiving, sending, and/or modifying financing information. For example, the computing device 215 may be configured to send, receive, and/or generate financing information corresponding to and/or associated with one or more loans provided to payors of vehicles purchased from a dealer. Further, the computing device 215 may be configured to respond to queries associated with the financing information. For example, the computing device 220 may provide financing information to authorized computing devices comprising the computing devices 210, 220 and/or 225.

The computing device 220 may be associated with an administrative body (e.g., a department of motor vehicles) and may be configured to perform operations associated with receiving, sending, and/or modifying lien information. For example, the computing device 220 may be configured to receive lien information from the computing device 210, send the lien information to other computing devices including the computing device 210, 215, and/or 225; and/or perform operations on the lien information. The operations performed on the lien information may include generating and/or modifying lien information comprising title information. Generating and/or modifying the lien information may comprise generating an indication of whether there is a lien on a vehicle, and if there is a lien on a vehicle, whether the lien on the vehicle has been perfected. The computing device 220 may be configured to respond to queries associated with lien information. For example, the computing device 220 may provide lien information comprising title information to authorized computing devices comprising the computing devices 210, 215, and/or 225.

The computing device 225 may be configured to perform operations associated with prioritizing liens based on lien information and/or detecting risk in dealers associated with liens. The computing device 225 may be associated with a creditor/lienor and/or an entity that provides information to the creditor/lienor. For example, a creditor that provides loans to vehicle purchasers may operate the computing device 225 in order to prioritize liens that have been unperfected for a long duration and/or determine the dealers that present a higher risk of default. By way of further example, the computing device 225 may be operated by a credit reporting agency that may determine risks of dealer default and provide a requesting creditor with notifications associated with unperfected liens for which the creditor is the lienor and for which the risk of dealer default is may be high.

The computing device 225 may be configured to access and/or receive lien information from any of the computing devices 210, 215, and/or 220 and perform operations including prioritizing liens and/or dealers and/or detecting the risk of dealer default in dealers associated with the liens. The computing device 225 may include a machine learning model that has been configured and/or trained to detect a risk of dealer default based on an input that may include lien information that was correlated with financing information. The computing device 225 may then use the machine learning model to generate output including aggregate risk scores for the dealers associated with the liens. Furthermore, the operations performed by the computing device 225 may include generating one or more notifications associated with one or more dealers that have been determined to be higher risk. For example, the computing device 225 may generate a notification when a dealer has been determined to have an aggregate risk score that exceeds some threshold risk score. Further, the computing device 225 may be configured to respond to queries from one or more computing devices. For example, the computing device 225 may receive queries from a computing device associated with a creditor that is requesting a list of dealers that have a high risk of default.

Figure 3:
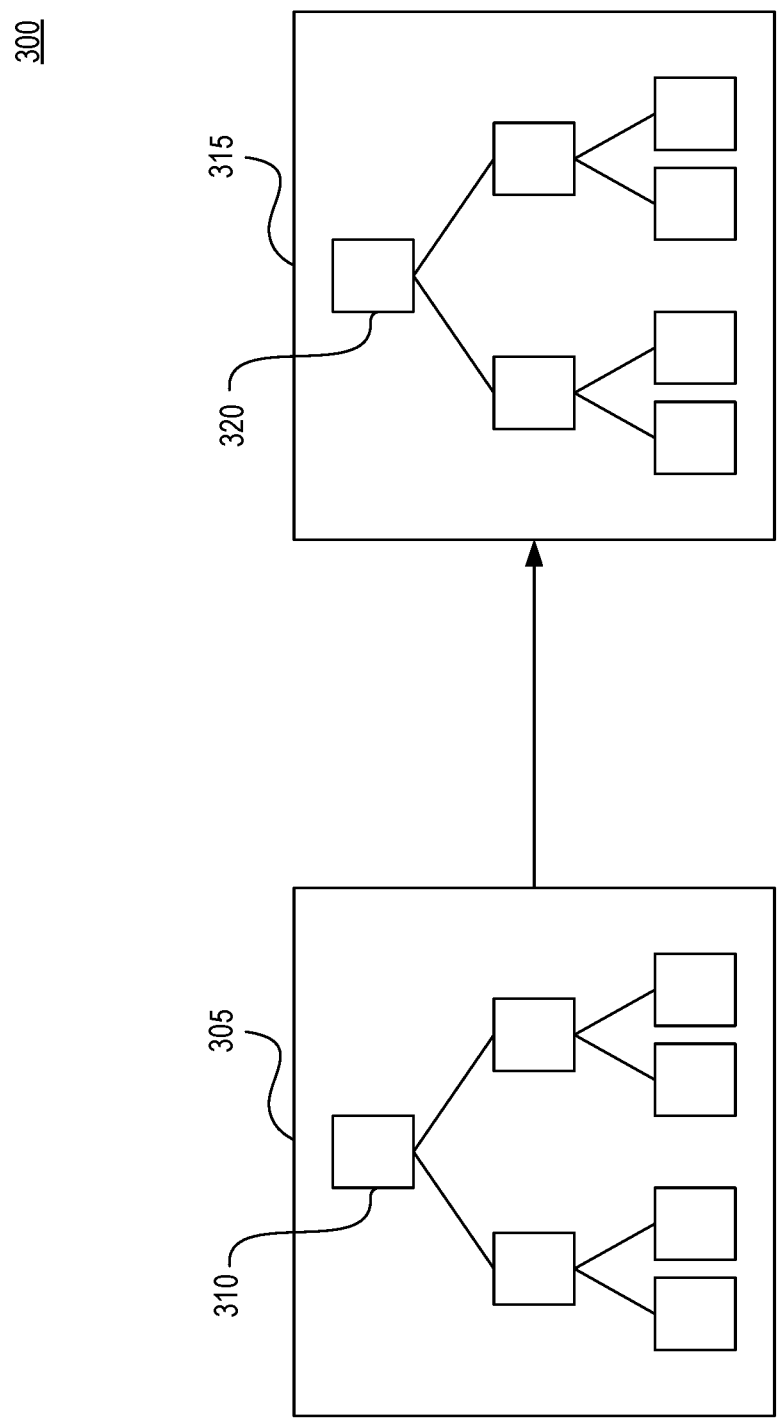
FIG. 3 illustrates an example of decision trees of a machine learning model according to one or more aspects of the disclosure.

FIG. 3 illustrates an example of decision trees of a machine learning model 300 that may be implemented on the computing system 100 illustrated in FIG. 1, according to a possible embodiment of the invention. The decision tree 305 may be generated using a first subset of a dataset comprising historical lien information, historical dealer information, and/or historical vehicle default information. The decision tree 305 may correspond to and/or be associated with any of the decision trees described herein including the first decision tree that is described in step 505 of the method 500 and/or the first decision tree that is described in step 605 of the method 600.

The decision tree 305 may include a plurality of nodes including, for example, the node 310. The plurality of nodes may correspond to a subset of the dataset. Any of the nodes of the decision tree may correspond to a respective parameter that is based on information from the first dataset. For example, the node 310 may correspond to and/or be associated with a parameter associated with a number of new vehicles in a dealer's inventory over a set of time periods (e.g., the number of new vehicles in a dealer's inventory at the end of each month over the course of six (6) months). Training the machine learning model 300 may include using different combinations of nodes (e.g., different parameters corresponding to subsets of the datasets), different decision tree depths, and pruning or adding nodes based on the contribution of a node parameter to the accuracy of the decision tree. For example, the parameter associated with the number of new vehicles in a dealer's inventory may have a significant impact on minimizing a loss function associated with the accuracy of predicting risks of dealer default and may therefore be included in the second decision tree. If the parameter associated with the number of new vehicles in a dealer's inventory did not have a significant impact on minimizing a loss function associated with the accuracy of predicting risks of dealer default and the parameter could be pruned and not included in the second decision tree.

The decision tree 305 may be generated using a first subset of a dataset comprising historical lien information, historical dealer information, and/or historical vehicle default information. One or more portions of the decision tree 305 may correspond to and/or be associated with any of the decision trees described herein including the first decision tree that is described in step 505 of the method 500 and/or the first decision tree that is described in step 605 of the method 600.

The decision tree 315 may be generated using a second subset of a dataset comprising historical lien information, historical dealer information, and/or historical vehicle default information. One or more portions of the decision tree 315 may correspond to and/or be associated with any of the decision trees described herein including the second decision tree that is described in step 505 of the method 500 and/or the second decision tree that is described in step 610 of the method 600.

The decision tree 315 may include a plurality of nodes including, for example, the node 320. The plurality of nodes may correspond to a second subset of the dataset. Any of the nodes of the decision tree 315 may correspond to a respective parameter that is based on information from the first dataset. The weighting of any of the parameters associated with the decision tree 315 may be adjusted based in part on the extent to which the weighting of the parameters of the decision tree 305 accurately predicted the risk of dealer default. For example, the parameters of the decision tree 305 that made a greater contribution to accurately predicting the risk of dealer default may be more heavily weighted in the decision tree 315. By way of further example, the parameters of the decision tree 305 that made a lower contribution to accurately predicting the risk of dealer default may be less heavily weighted in the decision tree 315. The decision tree 315 may be based in part on the decision tree 305 and may include one or more nodes that are based on, correspond to, are similar to, or are the same as one or more nodes of the decision tree 305. The decision tree 315 may include one or more nodes that were not included in the decision tree 305 and the inclusion or exclusion of nodes from the decision tree 305 may be based in part on one or more factors including an extent to which such nodes contributed to accurately predicting risks of dealer default.

The machine learning model 300 may be configured and/or trained using a variety of techniques. For example, the machine learning model 300 may be configured and/or trained using gradient boosting, random boosting, and/or other machine learning techniques. Further, the machine learning model 300 may be configured and/or trained using hyperparameter tuning techniques that adjust various hyperparameters (e.g., the number of decision trees that are used and/or the number of nodes in the decision trees) of the machine learning models. Hyperparameter tuning may allow for a more accurate machine learning model (e.g., the machine learning model 300 may more accurately detect the risk of dealer default). In some embodiments, hyperparameter tuning may comprise the use of a grid search technique in which an exhaustive or near exhaustive search for more effective values of hyperparameters is performed. By way of example, use of grid search on the machine learning model 300 may comprise configuring and/or training the machine learning model 300 using different numbers of tree nodes for the decision trees. After a plurality of iterations, the system may determine that amount of tree nodes that results in more accurate output (e.g., more accurate detection of dealer risk of default).

Configuring and/or training the machine learning model 300 may include the use of out of sample testing to test the efficacy of the machine learning model 300. For example, the machine learning model can be tested using one or more datasets that are different from the dataset that was used to configure and/or train the machine learning model 300. Further, the out of sample testing may include out of time testing that does not include the dataset that was initially used to configure and/or train the machine learning model 300. For example, out of time testing of the machine learning model 300 may include the use of a set of dealers that does not overlap with the set of dealers in the initial dataset used to configure and/or train the machine learning model 300. Based on the results of the out of time testing, the machine learning model may be periodically trained and/or calibrated using more up to date datasets. In some embodiments, configuring and/or training the machine learning model 300 may include the use of in time testing in which a portion (eighty percent (80%)) of the dataset is used to test twenty percent of the dataset. For example, a first dealer dataset associated with eighty percent (80%) of the dealers may be tested on a second dealer dataset associated with twenty percent (20%) of the dealers. The twenty percent (20%) of the dealers included in the second dealer dataset may overlap with the first dealer dataset, but will be different due to the different size of the dataset.

The dataset used to train the machine learning model 300 may include one or more subsets associated with the historical lien information, historical dealer information, and/or historical vehicle default information. For example, the dataset may comprise one or more subsets of historical lien information. For example, the historical lien information may include title information including the number of liens that were perfected each month over the course of a year, the names of dealers associated with liens, the liens that were perfected each month over the course of a year, and/or the duration that liens remained unperfected. The historical lien information may be used as part of the process of training the machine learning model 300 and each of the one or more subsets of historical lien information may correspond to one or more nodes of the decision trees (e.g., the first decision tree and/or the second decision tree). The historical lien information may be used when training the machine learning model 300. For example, the historical dealer information associated with the duration that liens remain unperfected may be used as a parameter of the decision tree. Over a plurality of training iterations, the system may determine the contribution of the duration that liens remain unperfected to detecting the risk of dealer default. If the contribution of the duration that liens remain unperfected is high (e.g., a greater duration of a lien remaining unperfected corresponds to a significantly greater risk of dealer default), the duration that liens remain unperfected may be a more heavily weighted node of the decision tree and may be used in subsequent decision trees. If the duration that liens remain unperfected is low (e.g., less influence in minimizing loss associated with a loss function), the respective parameter may be weighted less heavily and/or removed from the decision tree.

By way of further example, the dataset may comprise one or more subsets of historical dealer information corresponding to and/or associated with inventory including: new inventory count information corresponding to and/or associated with a number of new vehicles in a dealer's inventory at some periodic interval (e.g., the number of new vehicles in a dealer's inventory per month); present inventory count information corresponding to and/or associated with a number of vehicles in a dealer's current inventory at some periodic interval (e.g., the number of new vehicles in a dealer's inventory per month); cost to revenue information corresponding to and/or associated with the cost of all new vehicles added to the dealer's inventory divided by the value of sold vehicles every month; present inventory ratio information corresponding to and/or associated with the ratio between a number of current inventory count and the last 6-month average of inventory count; and/or cost to revenue information corresponding to and/or associated with the ratio between "cost to revenue" and the last 6-month average of "cost to revenue" of vehicles in the dealers inventory. The historical lien information corresponding to and/or associated with inventory may be used when training the machine learning model 300. For example, the historical dealer information associated with new inventory count may be used as a parameter of the decision tree 305 and/or 315. Over a plurality of training iterations, the system may determine the contribution of the new inventory count to detecting the risk of dealer default. If the contribution of the new inventory count is high (e.g., a greater amount of new vehicle inventory corresponds to a significantly greater risk of dealer default), the new vehicle inventory parameter may be a more heavily weighted node of the decision tree and may be used in subsequent decision trees. If the contribution of the new inventory count parameter is low (e.g., less influence in minimizing loss associated with a loss function), the respective parameter may be weighted less heavily and/or removed from the decision tree.

The dataset may comprise one or more subsets of historical dealer information corresponding to and/or associated with dealer loans and/or dealer applications including: prime loan count information corresponding to and/or associated with the number of prime loans of dealers in a predetermined time period (e.g., the past year); dealership business type information corresponding to and/or associated with the type of dealership; subprime applications approval rate information corresponding to and/or associated with the ratio of the number of approved subprime applications to all the subprime applications submitted at a dealer level in the past 12 months; high percentile loan financing information corresponding to and/or associated with a predetermined percentile (e.g., ninety-fifth percentile (95%) information) of subprime loans in a predetermined time period (e.g., the preceding twelve (12) months); ratio of total loans information corresponding to and/or associated with the percentage of total loans of a particular creditor among all lenders in a predetermined time period (e.g., the preceding year); and/or subprime cash out rate information corresponding to and/or associated with the ratio of number of funded loans to number of approved subprime applications in the past 12 months. The historical dealer information corresponding to and/or associated with the number of prime loans of dealers may be used when training the machine learning model 300. For example, the historical dealer information associated with the number of prime loans of dealers may be used as a parameter of the decision tree 305 and/or 315. Over a plurality of training iterations, the system may determine the contribution of the number of prime loans of dealers to detecting the risk of dealer default. If the contribution of the number of prime loans of dealers is high (e.g., a greater number of prime loans corresponds to a significantly greater risk of dealer default), the number of prime loans of dealer's parameter may be a more heavily weighted node of the decision tree and may be used in subsequent decision trees. If the contribution of the number of prime loans of dealer's parameter is low (e.g., less influence in minimizing loss associated with a loss function), the respective parameter may be weighted less heavily and/or removed from the decision tree.

The one or more subsets of historical dealer information associated with quantities and/or numbers of dealer loans and/or dealer applications may comprise: fund rate information corresponding to and/or associated with the ratio of the number of funded loans to all the applications submitted at a dealer level in the past 12 months; average loan amount information corresponding to and/or associated with the average loan amount finances of a creditor loans in the previous 12 months; ratio of credit union loans information corresponding to and/or associated with the portion of loans of Credit Union among all lenders in the past 4 quarters; ratio of old vehicles information corresponding to and/or associated with the portion of old vehicles of the top lender among all the lenders at that leadership in the past 4 quarters; max loan finance amount information corresponding to and/or associated with the max of loan amount finances of a creditor's loans in the previous 12 months; min near prime frontend amount information corresponding to and/or associated with the minimum of funded frontend amount of a creditor's near prime loans in the previous 12 months; number of prime loans information corresponding to and/or associated with the number of prime loans of a top lender in the past 4 quarters. The one or more subsets of historical dealer information may include statistical information that may be used to generate parameters of the machine learning model 300. For example, minimum and/or maximum loan financing amounts, average loan amounts, and/or the portions of certain types of loan amounts among dealers may be used as parameters corresponding to nodes of the decision trees 305 and/or 315.

The one or more subsets of historical dealer information may include information associated with dealer credit scores, approval rates, volume, and/or dealer applications. For example, the dealer information may further include: 95th percentile of credit score information corresponding to and/or associated with the 95 percentile of credit score of creditor near prime loans in the preceding 12 months; minimum loan amount information corresponding to and/or associated with the minimum loan amount finances of creditor loans in the previous 12 months; approval rate information corresponding to and/or associated with the number of approved applications to all the applications submitted at a dealer level in the past 12 months; number loans from top lenders information corresponding to and/or associated with the number of total loans of top lender in the past 4 quarters; minimum of near prime loan amount information corresponding to and/or associated with the minimum value of loan amount finances of creditor near prime loans in the previous 12 months; high volume dealer index information corresponding to and/or associated with whether the dealer is a high volume dealer that has at least 60 loans one year before the business date; and/or subprime median net discount information corresponding to and/or associated with the subprime median net discount given at the dealer in the previous 12 months. The one or more subsets of historical dealer information may include information associated with the credit ratings and/or volume of loans of dealers. For example, the credit ratings of a dealer may be used as a parameter of the decision tree 305 and/or 315. Depending on the extent to which the credit rating parameter contributes to accurately detecting a risk of dealer default, the credit rating parameter may be weighted more heavily. For example, if the credit rating parameter has a large contribution to minimizing the loss associated with detecting a risk of dealer default, the credit rating parameter may be more heavily weighted.

The one or more subsets of historical dealer information may further comprise information associated with amounts and/or values of dealer loans and/or dealer applications comprising: 5th percentile of near prime loan amount information corresponding to and/or associated with the 5th percentile of loan amount finances of creditor near prime loans in the previous 12 months; 5th percentile of funded front end amount information corresponding to and/or associated with the 5th percentile of funded frontend amount of creditor loans in the previous 12 months; average funded front end amount information corresponding to and/or associated with the average funded frontend amount of creditor subprime loans in the previous 12 months; number of loans originated by captive lenders information corresponding to and/or associated with the number of loans originated by captive lenders in the past 4 quarters at that leadership; subprime fund rate information corresponding to and/or associated with the ratio of the number of funded loans to all the subprime applications submitted at a dealer level in the past 12 months; number of loans of Independent Finance Company (IFC) lenders information corresponding to and/or associated with the number of loans of IFC lenders in the past 4 quarters; percentage of prime loans of top lenders information may include the percentage of prime loans of top lenders among all lenders; and/or median of subprime application income information corresponding to and/or associated with the median of subprime application total income of a creditor within a predetermined time period (e.g., the past twelve (12) months). The historical dealer information may be used when training the machine learning model 300. For example, the historical dealer information associated with the fifth percentile of near prime loan amounts may be used as a parameter of the decision tree. Over a plurality of training iterations, the system may determine the contribution of the fifth percentile of near prime loan amounts to detecting the risk of dealer default. If the contribution of the fifth percentile of near prime loan amounts is higher, the fifth percentile of near prime loan amounts may be a more heavily weighted node of the decision tree. If the fifth percentile of near prime loan amounts is lower (e.g., less influence in minimizing loss), the respective parameter may be weighted less heavily and/or removed from the decision tree.

The historical vehicle default information may comprise one or more subsets of the dataset comprising business failure score information corresponding to and/or associated with the risk of a business (e.g., a dealer) failing within a predetermined period of time (e.g., the risk of a dealer failing within the next six (6) months or the next twelve (12) months); years in business information corresponding to and/or associated with the number of years a dealer has been in business; oldest account credit granted information corresponding to and/or associated with an amount of time (e.g., a number of months) since credit was granted to the dealer for the dealer's oldest account; available credit information which may include a percentage of a dealer's credit limit that is available for use on open financial revolving accounts; recent lien information or judgment information corresponding to and/or associated with the age of recent liens or judgments against a dealer; recent account information corresponding to and/or associated with the number of months since credit was granted to a dealer's newest account; and/or satisfactory accounts information corresponding to and/or associated with a portion of the dealer's accounts that have been determined to be satisfactory (e.g., determined to be satisfactory by a credit agency) within a predetermined time period (e.g., the past twenty-four (24) months). The historical vehicle default information may be used when training the machine learning model 300. For example, the historical vehicle default information associated with business failure score may be used as a parameter of the decision tree. Over a plurality of training iterations, the system may determine the contribution of the business failure score to detecting the risk of dealer default. If the contribution of the business failure score is higher, the business failure score may be a more heavily weighted node of the decision tree. If the contribution of the business failure score is lower (e.g., less influence in minimizing loss), the respective parameter may be weighted less heavily and/or removed from the decision tree.

FIG. 4 illustrates an example of a method 400 for detecting a risk of dealer default in accordance with one or more aspects described herein. Method 400 may be implemented by a suitable computing system, as described further herein. For example, method 400 may be implemented by any suitable computing environment by a computing device and/or combination of computing devices, such as computing devices 101, 105, 107, and 109 of FIG. 1. Method 400 may be implemented in suitable program instructions, such as in machine learning software 127, and may operate on a suitable training set, such as training set data 129.

At step 405, the system may configure and/or train a machine learning model. The machine learning model may be configured and/or trained to detect a risk of dealer default. Training the machine learning model may include the use of a dataset comprising historical lien information, historical dealer information, and/or historical vehicle default information. For example, the system may train the machine learning model by inputting one or more subsets of the dataset into the machine learning model. Training the machine learning model may comprise generating a plurality of decision trees.

For example, configuring and/or training the machine learning model may comprise generating a first decision tree using a first subset of the dataset. Further, training the machine learning model may comprise generating a second decision tree using a second subset of the dataset. Furthermore, in some embodiments, training the machine learning model may include training one or more additional decision trees in addition to training the first decision tree and/or the second decision tree. The one or more additional decision trees may be based in part on the first decision tree and/or the second decision tree and may include one or more parameters that are used by the first decision tree and/or the second decision tree.

Configuring and/or training the plurality of machine learning models may be based in part on use of a gradient boosting technique/algorithm. Use of gradient boosting may include the generation of decision trees such that each subsequent decision tree is based in part on the previous decision tree. Further, each subsequent decision tree may be based on the differences between the outcome of the preceding decision tree and the ground truth targets (e.g., one or more differences between the predicted probabilities of a set of dealers risks of default by the machine learning model and the actual occurrence of the dealers defaulting). The system may adjust the weighting and/or composition (e.g., the parameters that are included in a decision tree) of parameters of the decision trees based on the use of a loss function that generates a loss associated with the accuracy of detecting a risk of dealer default. The parameters that make a greater contribution to minimizing the loss that is output by the loss function may be more heavily weighted than the parameters that make less of a contribution to minimizing the loss that is output by the loss function.

The dataset may include statistics that are based on information comprising historical lien information, historical dealer information, and/or historical vehicle default information. The statistics included in the dataset may include mean, mode, median, maximum, minimum, minimum, and/or standard deviation that is associated with the dataset. For example, the dataset may include a mean number of vehicles sold by a set of one-hundred (100) dealers during the past year. By way of further example, the dataset may include minimum and maximum amounts of vehicles in a dealer's inventory over the course of some time period (e.g., a year). The dataset may include information that is structured in different file types, including textual data (e.g., HyperText Markup Language (HTML), extensible Markup Language (XML), plain text, or the like); image data (e.g., JPEG, TIFF, PDF, or the like); tabular data (such as comma-separated values (CSV), tab-delimited file (TAB), or the like); or another field type.

The historical lien information may comprise lien perfection information corresponding to and/or associated with the one or more vehicles. The lien perfection information for a vehicle may indicate whether there is a lien on a vehicle. Lien perfection may indicate whether the lien for a vehicle is perfected, whether the lien for a vehicle is not perfected, or whether the status of a lien for a vehicle has not been determined and/or is unavailable. The historical lien information may include information corresponding to and/or associated with the name of the dealer associated with property (e.g., a dealer of vehicles), a copy of the title, the name of the lien holder (e.g., a creditor with a security interest in the property), the name of the lienee/payor, and/or the type of property.

Furthermore the historical lien information may correspond to and/or be associated with one or more lenders/creditors historical rates of perfection. For example, the historical lien information may indicate that a particular lender/creditor has a higher than average historical rate of perfection.

The historical dealer information may include historical inventory information corresponding to the respective dealers. For example, the historical dealer information may include the number of vehicles that were in a dealer's inventory at the end of each month in the past year. Additionally and/or alternatively any information associated with one or more transactions of the dealer, current dealer inventory (e.g., the total number of vehicles in a dealer's inventory and/or the number of new vehicles added to the dealer's inventory in a specific time period), and/or dealer revenue information including the amount of revenue generated by the dealer in a specific time period (e.g., the amount of revenue generated from vehicle sales in a particular month). Further, the historical dealer information may include the name of a dealer and/or the geographic location of a dealer.

The historical dealer information may comprise information indicating a rate of default corresponding to historical vehicles and/or one or more demographics. For example, the historical dealer information may comprise a rate of default corresponding to the income of one or more lienees/payors.

The historical vehicle default information may include any information associated with dealers that have defaulted in the past. For example, the historical vehicle default information may include a number of dealers in a geographic area that have defaulted within a specified time period (e.g., the number of dealers that have defaulted in the past year).

The machine learning model may include one or more decision trees (e.g., the first decision tree and/or the second decision tree) and may use one or more techniques including gradient boosting. Consistent with the present disclosures, other models and/or algorithms may also be employed, including recurrent neural network models (RNN), convolutional neural network models (CNN), support-vector networks, induction of decision trees, random forests, bootstrap aggregating, k-means clustering, k-nearest neighbors (k-NN), k-medoids clustering, regression, Bayesian networks, relevance vector machine (RVM), support vector machines (SVM), generative adversarial networks (GAN), and the like. The present disclosure may utilize other statistical analysis methods, which may include multivariate or univariate statistical analysis.

Selected data (e.g., the dataset comprising a first subset and a second subset) may be transferred into a memory device within a processor or computing device. Machine learning software located within the processor or computing device may be configured to receive the selected data. Machine learning software may be previously trained, run a training program immediately subsequent data profiling, or designed for active learning alongside the data profiling step. Training may entail one or more training dataset batches, one or more epochs, hyperparameter tuning, optimization models, and the like.

The processor or computing device may be configured to automatically access and/or receive a dataset comprising historical lien information, historical dealer information, and/or historical vehicle default information using the above described models, algorithms, or methods. Training the machine learning model may include generating a first decision tree of the machine learning model using a first subset of the dataset. For example, using a first subset of the dataset may include selecting a first subset of information that includes historical lien information, historical dealer information, and/or historical vehicle default information that corresponds to a first subset of dealers.

Training the machine learning model may include generating a second decision tree of the machine learning model using a second subset of the dataset. For example, using a second subset of the dataset may include selecting a second subset of information that includes historical lien information, historical dealer information, and/or historical vehicle default information that corresponds to a second subset of dealers.

The second subset of the dataset may be different from the first subset of the dataset (e.g., the second subset may include historical dealership information that was not included in the first subset of the dataset). The second subset of the dataset may include some information that is in the first subset of the dataset (e.g., the second subset may include some information that is in the first subset and may also include some information that is not in the first subset).

Configuring and/or training the machine learning model may comprise generating a first decision tree that comprises a plurality of nodes that are based on one or more subsets of the dataset comprising the historical lien information, historical dealer information, and/or the historical vehicle default information. The system may generate a first decision tree based at least in part on a subset (e.g., a randomly selected subset) of parameters that are based at least in part on features of the dataset. For example, the subset of parameters may be associated with features including the historical vehicle inventory of dealers and/or a historical number of prime loans per month over the past year. Further the system may generate the first decision tree based on a subset of dealers associated with the historical lien information, historical dealer information, and/or the historical vehicle default information.

The system may use hyperparameter tuning to optimize a set of hyperparameters and improve the performance of the machine learning model. For example, based at least in part on use of a loss function associated with the accuracy of detecting dealers risks of default, the system may adjust one or more hyperparameters that may be associated with minimization of the loss (e.g., the hyperparameters that result in a lower loss that corresponds to more accurate detection and/or prediction of dealer risk). The one or more hyperparameters may include a number of decision trees that are used, a number of nodes in a decision tree which may be associated with the depth of a decision tree, a size of a one or more subsets of data, and/or a learning rate. For example, hyperparameter tuning may be used to determine the number of decision trees that are used based in part on the extent to which the addition of another decision tree results in greater accuracy of detecting a risk of dealer default. The system may determine a number of decision trees beyond which the addition of another decision tree does not increase (or decreases) the accuracy of detecting a risk of dealer default. Improving an accuracy of detecting the risk of dealer default may include increasing a true positive rate (e.g., detecting a risk of a dealer defaulting when the actual dealer defaults) and/or decreasing a false positive rate (e.g., detecting a risk of a dealer defaulting when the actual dealer does not default).

Furthermore, the system may use one or more optimization algorithms to optimize the decision trees. The system may use a grid search algorithm that may generate parameter candidates for a decision tree by fitting different combinations of parameters to the decision tree based on a grid of parameters. Over a plurality of iterations in which different combinations of parameters are used, the system may determine an improved combination of parameters that may result in more accurate detection of a dealer's risk of default. The grid of parameters may be based on parameters that correspond to one or more subsets of the dataset. For example, the grid of parameters may comprise parameters associated with historic dealer monthly inventory and/or monthly loan amounts over some predetermined time period (e.g., a year). Over a plurality of iterations, the system may determine the parameters that make the most significant contribution to accurately detecting a dealer's risk of default. The grid of parameters may comprise any of the parameters described in the machine learning model 300 that is illustrated in FIG. 3.

The system may use any of the models, algorithms, methods, or the like that are described herein to configure and/or train a machine learning model to detect a risk of dealer default.

At step 410, the system may automatically receive, access, obtain, and/or retrieve lien information. The lien information may correspond to and/or be associated with one or more vehicles. The lien information may comprise a number of vehicles and/or the types of vehicles that are in the respective inventories of dealers. For example, the lien information may indicate the number of vehicles in a dealer's inventory over a set of time periods including a most recent time period for which lien information is available (e.g., the current month). The lien information may be received from a computing system and/or computing device that is associated with an organization (e.g., an administrative body including a department of motor vehicles) that processes lien information including lien information associated with one or more vehicles. Further, the lien information may be based in part on information that the administrative body receives from one or more dealers that include requests to perfect liens for one or more vehicles.

The lien information may comprise title perfection information. The title perfection information may correspond to and/or be associated with the one or more vehicles in a dealer's inventory that have a perfected title and/or the one or more vehicles in a dealer's inventory that do not have a perfected title. The lien information may comprise title perfection information recorded by an administrative body (e.g., a department of motor vehicles and/or a similar agency that stores, maintains, and/or provides title perfection information). Furthermore, the lien information may correspond to one or more respective amounts of time that the one or more liens have been unperfected. For example, the lien information may indicate an amount of time since a lien was submitted to an administrative body that the lien has remained unperfected. Further, the lien information may include a status of a lien which may include one or more actions that have been performed on the lien. For example, the status of the lien may indicate how many of the steps to perfect the lien have been completed. Further, the status of the lien may indicate the relative position of a lien in a lien queue. For example, the status of the lien may indicate that a lien is near the top of a queue and may include an estimated time of perfection for the lien based on the rate of perfection of other liens in the lien queue.

The lien information may comprise the name of the dealer, the name of the vehicles that have a perfected title, the name of the vehicles that do not have perfected title, the names of the lienees/payors that are associated with the vehicles, the type of dealer, and/or the location (e.g., the state and/or county) in which the dealer is located.

At step 415, the system may automatically generate prioritized lien information. Generation of the prioritized lien information may be based on selection of the one or more liens that satisfy one or more criteria. For example, the information for the one or more liens that satisfy some portion of the one or more criteria may be included as part of the prioritized lien information that is generated and the one or more liens that do not satisfy some portion of the one or more criteria may not be included as part of the prioritized lien information.

Satisfying the one or more criteria may comprise lien information indicating a lien being unperfected for greater than a threshold amount of time (e.g., the criteria is satisfied if the lien information indicates that a lien has been unperfected for greater than thirty (30) days), the lien information not indicating an amount of time that the lien has been unperfected (e.g., the criteria is satisfied if the system access the lien information and determines that the lien information does not indicate the length of time a lien has not been perfected), the lien information not being associated with a vehicle (e.g., the criteria is satisfied if the lien information does not indicate vehicle details including the vehicle identifier and/or the vehicle price), and/or the lien information not being associated with a lender and/or a dealer (e.g., the criteria is satisfied if the lien information does not indicate the name of the dealer and/or lender that is associated with the vehicle). By way of further example, the threshold amount of time may be based in part on an average amount of time that the one or more liens of a particular dealer have been unperfected or the average amount of time that the liens of a plurality of dealers has been unperfected.

Generation of the prioritized lien information may comprise the system accessing the lien information and determining the lien information that satisfies one or more criteria. The system may, for example, access lien information associated with the time at which a lien was received at an administrative body (e.g., a department of motor vehicles) and determine how long the lien was been unperfected based on the time the lien was received by the administrative body and the time at which the lien was accessed by the system. If the one or more criteria included a criterion that the lien was not perfected for greater than thirty (30) days and the lien was unperfected for fifty (50) days, the system can select the lien satisfies the one or more criteria and may generate prioritized lien information that comprises the lien that satisfies the one or more criteria.

Generation of the prioritized lien information may comprise prioritizing the one or more liens that satisfy the one or more criteria by ranking, from the aggregate risk scores that are lowest to the aggregate risk scores that are highest, the one or more liens that satisfy the one or more criteria. The one or more criteria may further include a threshold ranking such that the prioritized lien information includes a predetermined number of the one or more liens that satisfy the one or more criteria. For example, the threshold ranking may correspond to a threshold aggregate risk score and the one or more liens that are equal to or above the threshold aggregate risk score.

At step 420, the system may automatically access and/or receive financing information. The financing information may correspond to and/or be associated with one or more vehicles (e.g., the one or more vehicles corresponding to the lien information). Further, the financing information may comprise dealership financing information for the one or more vehicles. For example, the financing information may comprise a dealer identifier comprising a dealer name, vehicle identifiers respectively associated with one or more vehicles, and/or credit ratings for one or more lienees/payors respectively associated with the one or more vehicles. The financing information may comprise one or more loan amounts (e.g., one or more original loan amounts and/or one or more currently outstanding balances) for the one or more lienees/payors associated with the one or more vehicles.

At step 425, the system may correlate the lien information with the financing information. The system may use any of the models, algorithms, methods, or the like that are described herein to correlate the lien information with the financing information.

In some embodiments, the system may generate correlated lien information. Generating the correlated lien information may be based on: correlating the lien information with the financing information; and/or correlating the prioritized lien information with the financing information. The system may use any of the models, algorithms, techniques, methods, or the like described herein to generate the correlated lien information.

Correlating the lien information with the financing information may comprise performing an analysis of the lien information and the financing information to determine one or more relationships between the lien information and the financing information. Correlating the lien information with the financing information may comprise determining the lien information that is related to changes in the financing information and/or the financing information that is related to changes in the lien information. For example, the system may access the lien information that is associated with the credit rating of a lienee/payor and search the financing information for financing information associated with that lienee/payor and/or other lienee/payors with similar credit ratings. By way of further example, the system may access the lien information comprising the title information that indicates whether a vehicle has perfected title and may search the financing information for financing information associated with the credit rating of lienees/payors associated with vehicles that have perfected title. Furthermore, the correlated lien information may be formatted to be used as an input or part of an input to a machine learning model.

The financing information may correspond to and/or be associated with one or more lenders/creditors. For example, the financing information may include information associated with the name of a lender/creditor and/or the amount loaned by the lender/creditor. Further, the correlated lien information may be generated by determining the one or more liens that correspond to the one or more lenders/creditors. For example, the correlated lien information may include the lien information and the financing information that has the same lender/creditor.

At step 430, the system may generate and/or determine aggregate risk scores. The aggregate risk scores may correspond to and/or be associated with one or more liens (e.g., aggregate risk scores for respective liens) and/or one or more dealers (e.g., aggregate risk scores for respective dealers). The aggregate risk scores corresponding to and/or associated with one or more liens may be associated with the risk of default by a dealer associated with a lien (e.g., the dealer may be the entity responsible for providing vehicle financing information as part of the lien perfection process).

The aggregate risk scores may be based on inputting the correlated lien information into a machine learning model. For example, the correlated lien information may be used as the basis for an input to any of the plurality of decision trees of a machine learning model (e.g., the machine learning model configured and/or trained at step 405).

Further, a machine learning model may be configured and/or trained to receive correlated lien information as an input. For example, the machine learning model may be configured and/or trained using a gradient boosting technique that generates a plurality of decision trees. The machine learning model may use the correlated lien information as an input on which one or more operations are performed. Further, the machine learning model may evaluate the input using values of the correlated lien information that correspond to parameters of the machine learning model. For example, the machine learning model may receive information associated with dealer vehicle inventory over time as an input. The machine learning model may then generate an output including the aggregate risk scores.

Generating the aggregate risk scores may use any of the models, algorithms, and/or methods described herein. For example, the system may perform another machine learning technique (e.g., random forest) using the machine learning model to generate the aggregate risk scores for one or more liens.

At step 435, the system may prioritize the one or more liens that satisfy the one or more criteria. Prioritizing the one or more liens that satisfy the one or more criteria may be based on the aggregate risk scores. For example, the system may prioritize the one or more liens that satisfy the one or more criteria based on the aggregate risk scores for the one or more liens respectively.

The system may determine that the one or more liens that satisfy the one or more criteria and have the aggregate risk scores equal to or above a threshold risk score may have the higher priority than the aggregate risk scores that are below the threshold risk score. If the aggregate risk score for two or more liens is the same, the system may determine that the two or more liens have the same priority. Additionally and/or alternatively, if the aggregate risk score for two or more liens is the same, the system may determine that a lien that has been unperfected for a longer duration than another lien with the same aggregate risk score may have a higher priority. The priority of the one or more liens that satisfy the one or more criteria may be associated with the relative importance of the respective one or more liens and may be used to determine the immediacy with which the one or more liens should be acted upon.

The one or more liens that satisfy the one or more criteria may be prioritized by ranking, from lowest to highest, based on the aggregate risk scores, the one or more liens that satisfy the one or more criteria. For example, the system may determine that the highest priority lien is the lien that has the highest aggregate risk score and that the lowest priority lien is the lien that has the lowest aggregate risk score.

At step 440, the system may automatically compare the aggregate risk scores to a threshold risk score. The system may use any of the models, algorithms, methods, or the like described herein to compare the aggregate risk score to the threshold risk score. For example, the aggregate risk scores may correspond to numeric values that are compared to a numeric value of threshold risk score. The comparison may correspond to and/or be associated with the extent to which the aggregate risk scores match and/or are similar to threshold risk score.

At step 445, the system may automatically determine whether at least one aggregate risk score of the aggregate risk scores exceeds or is equal to a threshold risk score. The threshold risk score may be determined based on the aggregate risk scores. For example, the threshold risk score may be based on an average value of the aggregate risk scores, a deviation based on a distribution of the aggregate risk scores, or a predetermined value that is based on aggregate risk scores determined by training machine learning models that generated aggregate risk scores based on historical lien information, historical dealer information, and/or historical vehicle default information. The system may use any of models, algorithms, methods or the like described herein to automatically determine whether at least one aggregate risk score of the aggregate risk scores exceeds the threshold risk score. The system may use risk score statistics that are based on information comprising the aggregate risk scores. The risk score statistics may include a mean, mode, median, maximum, minimum, minimum, and/or standard deviation that is associated with the aggregate risk scores. For example, the system may automatically determine the mean risk score of the aggregate risk scores and determine the threshold risk score by adding the mean risk score to some proportion of the mean risk score (e.g., twenty (20) percent of the mean risk score).

At step 450, in response to the system determining that at least one of the aggregate risk scores exceeds or is equal to the threshold risk score, the system may generate one or more notifications associated with the aggregate risk scores that exceed the threshold risk score. For example, the system may automatically generate one or more notifications that are sent to a lender/creditor when the aggregate risk score for a dealer exceeds and/or is equal to the threshold risk score. The one or more notifications may comprise a dealer identification that identifies the dealer; a dealer name (e.g., a business name of a dealer); an aggregate risk score (e.g., a numerical value that may include a score from one (1) to ten (1) with one (1) indicating a lowest risk and ten (10) indicating a highest risk); a color coded risk indicator in which a green indication may correspond to a low aggregate risk score for a dealer, a yellow indication may correspond to an intermediate aggregate risk score, and a red indication may correspond to a high aggregate risk score; a total outstanding amount of debt that the dealer is associated with; one or more reasons associated with the aggregate risk score of a dealer (e.g., the one or more reasons may be associated with particular values of dealer features that may have contributed significantly to the aggregate risk score of the dealer); and/or contact information for a dealer (e.g., a dealer street address, a dealer telephone number, and/or an Internet web site of the dealer).

Additionally, and/or alternatively the threshold risk score may be a previously calculated value that is programmed into the system. The system may use any of the models, algorithms, methods or the like described herein to determine if at least one of the aggregate risk scores is greater than a threshold risk score. For example, the system may use one or more comparison functions to compare the aggregate risk scores to a threshold risk score and output the result to the system.

The system determining that at least one of the aggregate risk scores does not exceed the threshold risk score, may cause the system to stop and/or may cause the method 400 to end. The system determining that at least one of the aggregate risk scores does not exceed the threshold risk score, may cause the system to receive additional lien information (e.g., return to step 410 and receive additional lien information).

Furthermore, at step 450 the system may use any of the models, algorithms, methods, or the like that are described herein to generate the notification. The system may generate a notification that is provided via an output device. For example, the system may generate a notification that is provided via a display device (e.g., the display 120). The system may generate an interface (e.g., a graphical user interface) that is configured to receive one or more inputs (e.g., touch inputs via a touch screen of the display device). For example, in response to the system generating a notification that a particular dealer is associated with an aggregate risk score that exceeds the threshold risk score, the interface generated by the system may receive a touch input that may cause the system to provide additional information about the dealer.

FIG. 5 illustrates an example of a method 500 for detecting a risk of dealer default in accordance with one or more aspects described herein. Method 500 may be implemented by a suitable computing system, as described further herein. For example, method 500 may be implemented by any suitable computing environment by a computing device and/or combination of computing devices, such as computing devices 101, 105, 107, and 109 of FIG. 1. Method 500 may be implemented in suitable program instructions, such as in machine learning software 127, and may operate on a suitable training set, such as training set data 129. Furthermore, one or more steps and/or one or more portions of method 500 may be incorporated into method 400.

Figure 6:
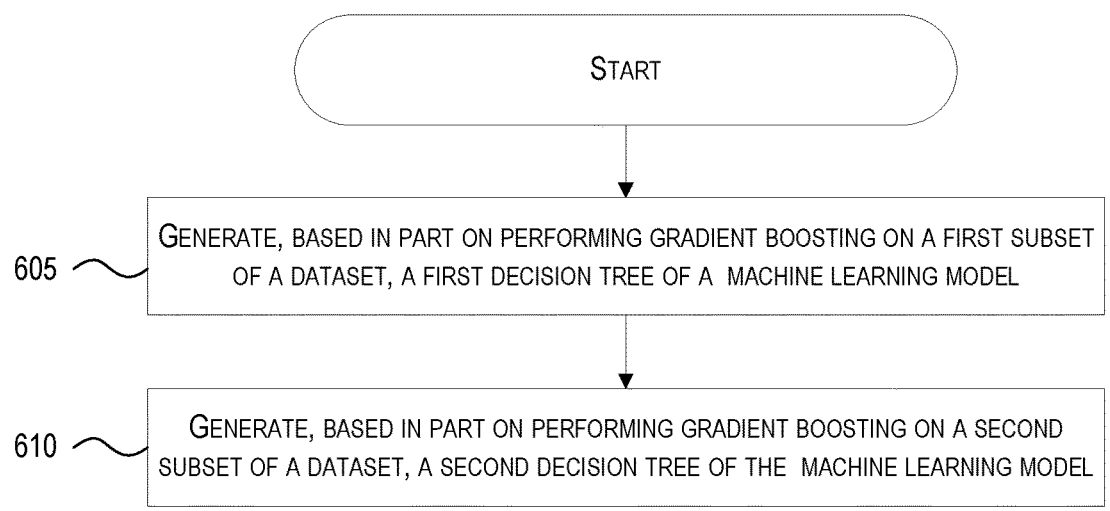
FIG. 6 illustrates an example flow chart for a method of training a machine learning model to detect a risk of dealer default in accordance with one or more aspects described herein.

At step 505, the system may generate and/or determine aggregate risk scores for dealers (e.g., aggregate risk scores for respective dealers). Generating the aggregate risk scores may be based on the lien information correlated with the financing information (e.g., the lien information that was correlated with the financing information at step 425 of the method 400), based on the first decision tree (e.g., the first decision tree generated at the step 405 of the method 400 and/or the first decision tree described at step 605 that is illustrated in FIG. 6), and/or based on the second decision tree (e.g., the second decision tree generated at the step 405 of the method 400 and/or the second decision tree described at step 610 that is illustrated in FIG. 6)). Furthermore, the first decision tree and/or the second decision tree may be based on any of the decision trees described herein including the machine learning model 300 that is illustrated in FIG. 3.

Generating and/or determining the aggregate risk scores may comprise inputting the historical inventory information and/or the historical vehicle default information into the machine learning model. For example, a machine learning model may be configured and/or trained to receive the historical inventory information and/or historical vehicle default information as an input, perform one or more operations on the input (e.g., operations including using one or more decision trees generated using gradient boosting techniques and the historical inventory information and/or historical vehicle default information), and generate an output including the aggregate risk scores.

Generating and/or determining the aggregate risk scores for dealers may be based on one or more other decision trees other than the first decision tree and/or the second decision tree. For example, if one or more other decision trees were generated the aggregate risk scores for dealers may be based on the first decision tree, the second decision tree, and/or any of the one or more other decision trees.

The aggregate risk scores may comprise a first aggregate risk score for a first dealer. The aggregate risk scores may comprise other risk scores for any other set of dealers (e.g., a set of aggregate risk scores for dealers that may not include the first dealer). For example, the system may use a machine learning model (e.g., a machine learning model that was configured and/or trained using gradient boosting or some other machine learning technique) to generate the aggregate risk scores for a set of the dealers including the first dealer and/or other dealers.

Generating and/or determining the aggregate risk scores for dealers may use any of the models, algorithms, and/or methods described herein. For example, the system may generate the aggregate risk scores based on a machine learning model that was configured and/or trained using another machine learning technique (e.g., adaptive boosting).

At step 510, the system may automatically compare the first aggregate risk score to other risk scores of the aggregate risk scores. The system may use any of the models, algorithms, and/or methods described herein to compare the first aggregate risk score to other risk scores of the aggregate risk scores. The comparison may correspond to and/or be associated with the extent to which the first aggregate risk score matches and/or is similar to the other risk scores of the aggregate risk scores. The resulting comparison may produce a similarity value (e.g., a numerical value which may be expressed as a number or a percentage) that indicates the extent to which the first aggregate risk score matches and/or is similar to the other risk scores of the aggregate risk scores. For example, the comparison may produce a similarity value comprising a percentage value of the similarity between the first aggregate risk score and the other risk scores of the aggregate risk scores (e.g., a risk score of eighty (80) would be 200% of another aggregate score of forty (40)). By way of further example, the comparison may produce a delta value that indicates the difference between the first aggregate risk score and the other risk scores of the aggregate risk scores (e.g., a first risk score of fifty (50) would have a delta value of ten (10) in comparison to another risk score of forty (40) and a delta value of (−15) in comparison to another risk score of sixty-five (65)).

The system may compare a risk score that is not the first aggregate risk score to any of the other aggregate risk scores. The comparison may use any of the models, algorithms, methods, or the like described herein to compare the first aggregate risk score to other risk scores of the aggregate risk scores. The system may use any of the models, algorithms, methods, or the like described herein to compare a risk score that is not the first aggregate risk score to any of the other aggregate risk scores. The resulting comparisons may produce a set of probabilities of any of the aggregate risk scores matching any of the other aggregate risk scores.

At step 515, the system may automatically determine whether the first aggregate risk score exceeds a threshold risk score. The threshold risk score may be determined based on the aggregate risk scores. For example, the threshold risk score may be based on any of the other aggregate risk scores (e.g., the aggregate risk scores other than the first aggregate risk score). For example, the system may automatically determine that the first aggregate risk score exceeds a threshold risk score based on the comparison of the first aggregate risk score to an average value of the other aggregate risk scores.

Determining the threshold risk score may comprise determining a deviation of the first aggregate risk score based on a distribution of the aggregate risk scores. For example, determination of the threshold risk score may include determining a distribution of the aggregate risk scores and then determining that the threshold risk score is the aggregate risk score that is a predetermined number of standard deviations from the mean of the aggregate risk scores (e.g., two (2) standard deviations from the mean of the aggregate risk scores).

The system may automatically determine whether the first aggregate risk score is between a first threshold risk score and a second threshold risk score (e.g., the system may determine whether the aggregate is within a range comprising the first threshold risk score at one end of the range and the second threshold risk score at another end of the range). For example, the system may determine that the risk score is between a first threshold risk score and a second threshold risk score. Determining the first threshold risk score and the second threshold risk score may include determining a deviation range of the first aggregate risk score based on a distribution of the aggregate risk scores. For example, the system may determine that the first threshold risk score is one (1) standard deviation from the mean of the aggregate risk scores and that the second threshold risk score is two (2) standard deviations from the mean of the aggregate risk scores. By way of further example, the system may determine that the first threshold risk score is one (1) standard deviation from the mean of the aggregate risk scores and that the second threshold risk score is some additional predetermined value greater than the first threshold risk score.

The system may use any of the models, algorithms, methods or the like that are described herein to automatically determine the threshold risk score.

Determining the threshold risk score can be based at least in part on inputting the aggregate risk scores and historical default information into a machine learning model. For example, a machine learning model may be configured and/or trained to receive the aggregate risk scores as an input, perform one or more operations on the input (e.g., operations including using gradient boosting techniques on the aggregate risk scores), and generate an output including the threshold risk score.

Additionally, and/or alternatively the threshold risk score may be previously calculated and programmed into the system. The system may use any of the models, algorithms, methods or the like described herein to determine if the first aggregate risk score is greater than a threshold risk score. For example, the system may use one or more comparison functions to compare the first aggregate risk score to a threshold risk score and output the result to the system.

The system determining that the first aggregate risk score does not exceed the threshold risk score, may cause the system to stop and/or may cause the method 500 to end. The system determining that the first aggregate risk score does not exceed the threshold risk score, may cause the system to receive additional lien information (e.g., return to step 410 of the method 400 and receive additional lien information).

At step 520 (e.g., after determining that the first aggregate risk score exceeds the threshold risk score), the system may automatically generate a notification that the first aggregate risk score exceeds the threshold risk score. The system may use any of the models, algorithms, methods, or the like described herein to generate the notification. The system may generate a notification that is provided via an output device. For example, the system may generate a notification that is provided on a display device (e.g., the display 120). The notification may comprise an indication of the name of the dealer that is associated with the first aggregate risk score that exceeds the threshold risk score. Additionally, the notification may comprise an indication of the aggregate risk score, the threshold risk score, and/or the extent to which the dealer associated with the first aggregate risk score exceeds the threshold risk score.

If a first aggregate risk score and a second aggregate risk score were generated, the system may generate a notification that the first aggregate risk score is between the first threshold risk score and the second threshold risk score. For example, the system may generate a notification that the first aggregate risk score is higher than the first threshold risk score and lower than the second threshold risk score. The system may also generate a notification that comprises the first aggregate risk score, the first threshold risk score, and/or the second threshold risk score, any of which may be displayed on a display device.

The aggregate risk scores may be associated with the names of dealers respectively. Further, the system may automatically generate one or more notifications for any of the aggregate risk scores that exceed the threshold risk score. For example, if seven (7) of the aggregate risk scores exceed the threshold risk score, the system may generate one or more notifications (e.g., seven (7) notifications) indicating the names of the dealers associated with the aggregate risk scores that exceeded the threshold risk score.

FIG. 6 illustrates an example of a method 600 for training a machine learning model to detect a risk of dealer default in accordance with one or more aspects described herein. Method 600 may be implemented by a suitable computing system, as described further herein. For example, method 600 may be implemented by any suitable computing environment by a computing device and/or combination of computing devices, such as computing devices 101, 105, 107, and/or 109 of FIG. 1. Method 600 may be implemented in suitable program instructions, such as in machine learning software 127, and may operate on a suitable training set, such as training set data 129. Furthermore, one or more steps and/or one or more portions of method 600 may be incorporated into method 400.

At step 605, the system may generate a first decision tree of a machine learning model (e.g., the decision tree 305 of the machine learning model 300 illustrated in FIG. 3, the machine learning model described at step 405 of the method 400 illustrated in FIG. 4, and/or the machine learning model described at step 505 of the method 500 illustrated in FIG. 5) using a first subset of a dataset. Generation of the first decision tree may be based in part on performing gradient boosting on a first subset of the dataset.

The first decision tree may include a plurality of nodes and each of the plurality of nodes may be associated with one or more subsets of the dataset that comprises the historical lien information, the historical dealer information, and/or the historical vehicle default information. For example, the first decision tree may be generated based at least in part on a dataset corresponding to information from a subset of eighty (80) dealers selected (e.g., randomly selected) from a dataset comprising one-hundred dealers.

Further, each of the nodes of the first decision tree may be used to test a parameter associated with a respective subset of the dataset. For example, the decision tree may include parameters corresponding to the number of vehicles a dealer sold, the number of vehicles a dealer added to the dealer's inventory, and/or the approval rate of loans. For each of the parameters of the decision tree, a weighting of the contribution of the parameter may be generated for the first decision tree. The contribution of each parameter may be used to predict the extent to which each parameter contributes to a dealer defaulting. For example, the number of new vehicles added to a dealer's inventory each month may be weighted more heavily because consistently adding new vehicles over an extended period of time is correlated with a lower probability of the dealer defaulting.

At step 610, the system may generate a second decision tree of a machine learning model (e.g., the decision tree 315 of the machine learning models 300 illustrated in FIG. 3, the machine learning model described at step 405 that is illustrated in FIG. 4, and/or the machine learning model described at step 505 that is illustrated in FIG. 5) using a second subset of a dataset. Generation of the second decision tree may be based in part on performing gradient boosting on a second subset of the dataset.

The second decision tree may include a plurality of nodes, and each of the plurality of nodes may be associated with one or more subsets of the dataset that comprises the historical lien information, the historical dealer information, and/or the historical vehicle default information.

The second subset of the dataset may be different from the first subset of the dataset. For example, the second subset of the dataset may include a subset of the dataset that is entirely different from the first subset of the dataset. By way of further example, the second subset of the dataset may include a combination of data that is the same as some data in the first subset and data that is different from the first subset. Furthermore, the second subset of data may comprise data that is more likely to accurately detect a risk of dealer default. The generation of the second subset of the dataset may be based in part on differences between predictions of a probability of dealer default resulting from use of the first decision tree and the actual results that indicate the dealers that actually defaulted.

The differences in the composition of the first decision tree and the second decision tree may allow increasingly more accurate predictions of the risks of dealers defaulting. Each subsequent decision tree may be based partly on the results of the preceding decision trees and parameters that do not contribute significantly may be weighted less heavily and/or pruned. For example, in a dataset that includes information from one-hundred (100) dealers, the second decision tree may be based at least in part on a second subset that includes information from twenty (20) dealers that were not included in the first subset of eighty (80) dealers that were used to generate the first decision tree. By using different subsets (e.g., the first subset and the second subset) of the dataset, more accurate results (e.g., more accurate predictions of which dealers will default) may be achieved by avoiding overfitting the machine learning model to the dataset.

Following the generation of the first decision tree and/or the second decision tree, the computing device may generate subsequent decision trees which may be based on subsets of the dataset that are different from the first subset and/or the second subset. The subsequent decision trees may further enhance the accuracy of the machine learning model 300.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The steps of the methods described herein are described as being performed in a particular order for the purposes of discussion. A person having ordinary skill in the art will understand that the steps of any methods discussed herein may be performed in any order and that any of the steps may be omitted, combined, and/or expanded without deviating from the scope of the present disclosure. Furthermore, the methods described herein may be performed using any manner of device, system, and/or apparatus including the computing devices, computing systems, and/or computing apparatuses that are described herein.

What is claimed is:

1. A method comprising:
    training, using a dataset comprising historical lien information, historical dealer information, and historical vehicle default information, and based on a gradient boosting technique by generating a plurality of decision trees using different subsets of the dataset, a machine learning model to detect a risk of dealer default, wherein the training comprises:
        generating, based in part on performing gradient boosting on a first subset of the dataset, a first decision tree of the machine learning model;
        generating, based in part on performing gradient boosting on a second subset of the dataset, a second decision tree of the machine learning model; and
        using hyperparameter tuning to optimize a plurality of hyperparameters comprising:
            a number of the plurality of decision trees of the machine learning model;
            a number of nodes in each of the plurality of decision trees;
            a size of one or more subsets of the historical lien information; and
            a learning rate;
    receiving, by a computing device, lien information corresponding to one or more vehicles associated with one or more dealerships, wherein the lien information comprises title perfection information;
    receiving, by the computing device, financing information corresponding to the one or more vehicles;
    correlating, by the computing device, the lien information with the financing information;
    generating, by the computing device, based on the lien information correlated with the financing information, using the machine learning model, and based on the optimized plurality of hyperparameters, aggregate risk scores for respective dealers, wherein the aggregate risk scores comprise a first aggregate risk score for a first dealer, and wherein the machine learning model comprises the first decision tree and the second decision tree that are generated by performing gradient boosting on the different subsets of the dataset;
    determining, by the computing device, and based on comparing the first aggregate risk score with other risk scores of the aggregate risk scores, that the first aggregate risk score exceeds a threshold risk score, wherein the threshold risk score is determined based on the aggregate risk scores;
    generating, by the computing device, a notification that the first aggregate risk score exceeds the threshold risk score;
    causing to display, on a user interface of a user device, an option to input additional dealer information for the first dealer associated with the first aggregate risk score;
    receiving, from the user device, the additional dealer information;
    generating, by the computing device and based on inputting the additional dealer information into the machine learning model, updated aggregate risk score for the first dealer; and
    causing to display, on the user interface and based on the updated aggregated risk score, a color-coded risk indicator for one or more liens associated with the first dealer.

2. The method of claim 1, further comprising determining the threshold risk score by determining a deviation of the first aggregate risk score based on a distribution of the aggregate risk scores.

3. The method of claim 1, further comprising determining the threshold risk score based on inputting the aggregate risk scores and historical default information into the machine learning model.

4. The method of claim 1, wherein the historical lien information comprises lien perfection information corresponding to the one or more vehicles.

5. The method of claim 1, wherein the historical dealer information comprises historical inventory information corresponding to the respective dealers.

6. The method of claim 5, wherein the determining the aggregate risk scores comprises inputting the historical inventory information and historical vehicle default information into the machine learning model.

7. The method of claim 6, wherein the historical vehicle default information comprises information indicating a rate of default corresponding to historical vehicles and one or more demographics.

8. The method of claim 1, wherein the lien information comprises the title perfection information recorded by a department of motor vehicles.

9. An apparatus comprising:
    one or more processors; and
    memory storing instructions that, when executed by the one or more processors, cause the apparatus to:
    train, using a dataset comprising historical lien information, historical dealer information, and historical vehicle default information, and based on a gradient boosting technique by generating a plurality of decision trees using different subsets of the dataset, a machine learning model to detect a risk of dealer default, wherein the training comprises:
        generating, based in part on performing gradient boosting on a first subset of the dataset, a first decision tree of the machine learning model; and
        generating, based in part on performing gradient boosting on a second subset of the dataset, a second decision tree of the machine learning model; and
        using hyperparameter tuning to optimize a plurality of hyperparameters comprising:
            a number of the plurality of decision trees of the machine learning model;
            a number of nodes in each of the plurality of decision trees;
            a size of one or more subsets of the historical lien information; and
            a learning rate;

receive lien information corresponding to one or more vehicles associated with one or more dealerships, wherein the lien information comprises title perfection information;

receive financing information corresponding to the one or more vehicles;

correlate the lien information with the financing information;

generate, based on the lien information correlated with the financing information, using the machine learning model, and based on the optimized plurality of hyperparameters, aggregate risk scores for respective dealers, wherein the aggregate risk scores comprise a first aggregate risk score for a first dealer, and wherein the machine learning model comprises the first decision tree and the second decision tree that are generated by performing gradient boosting on the different subsets of the dataset;

determine, based on comparing the first aggregate risk score with other risk scores of the aggregate risk scores, that the first aggregate risk score is between a first threshold risk score and a second threshold risk score, wherein the first threshold risk score is determined based on the aggregate risk scores; and generate a notification that the first aggregate risk score is between the first threshold risk score and the second threshold risk score;

cause to display, on a user interface of a user device, an option to input additional dealer information for the first dealer associated with the first aggregate risk score;

receive, from the user device, the additional dealer information;

generate, based on inputting the additional dealer information into the machine learning model, updated aggregate risk score for the first dealer; and cause to display, on the user interface and based on the updated aggregated risk score, a color-coded risk indicator for one or more liens associated with the first dealer.

10. The apparatus of claim 9, wherein the instructions, when executed by the one or more processors, cause the apparatus to determine the first threshold risk score and the second threshold risk score by determining a deviation range of the first aggregate risk score based on a distribution of the aggregate risk scores.

11. The apparatus of claim 9, wherein the instructions, when executed by the one or more processors, cause the apparatus to determine the first threshold risk score based on inputting the aggregate risk scores and historical default information into the machine learning model.

12. The apparatus of claim 9, wherein the historical lien information comprises lien perfection information corresponding to the one or more vehicles.

13. The apparatus of claim 9, wherein the historical dealer information comprises historical inventory information corresponding to the respective dealers.

14. The apparatus of claim 13, wherein the instructions, when executed by the one or more processors, cause the apparatus to determine the aggregate risk scores by inputting the historical inventory information and historical vehicle default information into the machine learning model.

15. The apparatus of claim 9, wherein the historical vehicle default information comprises information indicating a rate of default corresponding to historical vehicles and one or more demographics.

16. The apparatus of claim 9, wherein the lien information comprises the title perfection information recorded by a department of motor vehicles.

17. A system comprising:
a first computing device comprising:
one or more first processors; and
first memory storing first instructions that, when executed by the one or more first processors, cause the first computing device to:
train, using a dataset comprising historical lien information, historical dealer information, and historical vehicle default information, and based on a gradient boosting technique by generating a plurality of decision trees using different subsets of the dataset, a machine learning model to detect a risk of dealer default, wherein the machine learning model is trained using gradient boosting and hyperparameter tuning; and a second computing device comprising:
one or more second processors; and
second memory storing second instructions that, when executed by the one or more second processors, cause the second computing device to:
receive lien information corresponding to one or more vehicles, wherein the lien information comprises title perfection information;
receive financing information corresponding to the one or more vehicles associated with one or more dealerships;
correlate, the lien information with the financing information;
determine, based on the lien information correlated with the financing information, based on a plurality of hyperparameters, and using the machine learning model, aggregate risk scores for respective dealers, wherein the aggregate risk scores comprise a first aggregate risk score for a first dealer, and wherein the machine learning model comprises a first decision tree and a second decision tree that are generated by performing gradient boosting on the different subsets of the dataset;
determine, based on inputting the aggregate risk scores and historical default information into the machine learning model, a threshold risk score;
determine, based on comparing the first aggregate risk score with other risk scores of the aggregate risk scores, that the first aggregate risk score exceeds the threshold risk score;
generate a notification that the first aggregate risk score exceeds the threshold risk score; and
cause to display, on a user interface of a user device, an option to input additional dealer information for the first dealer associated with the first aggregate risk score;
receive, from the user device, the additional dealer information;
generate, based on inputting the additional dealer information into the machine learning model, updated aggregate risk score for the first dealer; and
cause to display, on the user interface and based on the updated aggregated risk score, a color-coded risk indicator for one or more liens associated with the first dealer.

18. The system of claim 17, wherein the second instructions, when executed by the one or more second processors, cause the second computing device to determine the threshold risk score by determining a deviation of the first aggregate risk score based on a distribution of the aggregate risk scores.

19. The system of claim 17, wherein the historical lien information comprises lien perfection information corresponding to the one or more vehicles, and wherein the historical dealer information comprises historical inventory information corresponding to the respective dealers.

20. The system of claim 19, wherein the second instructions, when executed by the one or more second processors, cause the second computing device to determine the aggregate risk scores by inputting the historical inventory information and the historical vehicle default information into the machine learning model.

* * * * *